United States Patent [19]

Feller

[11] Patent Number: 4,535,637
[45] Date of Patent: Aug. 20, 1985

[54] FLOW DETECTION APPARATUS

[75] Inventor: Murray F. Feller, Citrus County, Fla.

[73] Assignee: Wilgood Corporation, Dunnellon, Fla.

[21] Appl. No.: 578,283

[22] Filed: Feb. 8, 1984

Related U.S. Application Data

[63] Continuation-in-part of Ser. No. 487,226, Apr. 4, 1983, abandoned, which is a continuation-in-part of Ser. No. 467,138, Feb. 16, 1983, abandoned, which is a continuation-in-part of Ser. No. 427,611, Sep. 6, 1982, abandoned, which is a continuation-in-part of Ser. No. 215,524, Dec. 11, 1980, Pat. No. 4,399,696, which is a continuation-in-part of Ser. No. 150,142, May 15, 1980, Pat. No. 4,333,354, which is a continuation-in-part of Ser. No. 31,419, Apr. 19, 1979, abandoned.

[51] Int. Cl.³ .............................................. G01F 1/56
[52] U.S. Cl. ................................................ 73/861.77
[58] Field of Search ..................... 73/861.77, 861.78; 324/163, 166

[56] References Cited

U.S. PATENT DOCUMENTS

| | | |
|---|---|---|
| 3,626,209 | 12/1971 | Chandos . |
| 4,253,341 | 3/1981 | Ikeda et al. ...................... 73/861.77 |
| 4,306,457 | 12/1981 | Fukui et al. ...................... 73/861.77 |
| 4,324,144 | 4/1982 | Miyata et al. .................... 73/861.77 |
| 4,337,655 | 7/1982 | Sundstrom et al. .............. 73/861.77 |

FOREIGN PATENT DOCUMENTS

8104407 9/1983 Netherlands .

Primary Examiner—Herbert Goldstein

[57] ABSTRACT

The disclosed flow-detecting apparatus involves gating of phase-related excitation and sensed signals from electrodes close to a flow-activated tracker in a liquid passage. A high gain comparator provides peak-limited signals to the phase-comparison gate. In one form, a pair of excitation electrodes are symmetrical in relation to a single sensing electrode. That electrode supplies a sensed signal to one comparator input, the other comparator input having fixed bias. In another form, a pair of sensing electrodes are disposed in an excitation pattern between a localized excitation electrode and a metal pipe that forms the passage and acts as a second excitation electrode. The sensed signals reach respective input terminals of a high-gain comparator and it responds to the difference between the inputs. Other configurations of the electrodes and their excitation are disclosed, including one that promotes rejection of common-mode spurious signals. A comparator that receives flow-representing signals is stabilized against electrical unbalance by a negative feedback loop having a long time constant. In flow-detection apparatus having a multiple-rotor flow-sensing probe, separate flow-detection circuits are used for the respective rotors. The outputs of the flow-representing circuits are combined. Use of different excitation frequencies for those flow-detection circuits adds assurance of non-interfering operation of the flow-detection circuits.

28 Claims, 12 Drawing Figures

FLOW DETECTION APPARATUS

The present application is a continuation-in-part of my application Ser. No. 487,226 filed Apr. 4, 1983, now abandoned which is a continuation-in-part of my application Ser. No. 467,138 filed Feb. 16, 1983 for "Flow Detection Apparatus", now abandoned, which is a continuation-in-part of my application Ser. No. 427,611 filed Sept. 6, 1982 for "Flow Detection Apparatus", now abandoned, which is a continuation-in-part of my application Ser. No. 215,524 filed Dec. 11, 1980 for "Flow-Sensor Probes" (U.S. Pat. No. 4,399,696, issued Aug. 23, 1983) which is, in turn, a continuation-in-part of my U.S. Pat. No. 4,333,354 issued June 8, 1982 on application Ser. No. 150,142 filed May 15, 1980, the latter being a continuation-in-part of my application Ser. No. 31,419 filed Apr. 19, 1979 now abandoned. The foregoing applications are incorporated herein by reference.

In my '354 patent, electrodes are exposed to liquid flowing in a passage, for example water. Alternating-current electrode excitation sets up a pattern of current flow through the liquid. This pattern is variously modified by a liquid-driven vaned rotor of high resistivity material. The liquid is sensed, producing a modulated signal that is demodulated by means of amplitude or phase detectors. The frequency of the demodulated signal represents the flow rate. The operation depends on changing impedances of current paths through the liquid. Flow sensors of that type may be referred to as "impedance flow sensors".

In practice, the electrodes in the flow sensors of the '354 patent are made small, e.g. the ends of rods, so that the modulated signal tends to be relatively weak and requires considerable amplification. Spurious input or electrical "noise" develops at the sensing-electrode input to the detector circuit, tending to interfere with recognition of weak flow-representing signals.

An object of the present invention resides in providing a novel flow sensor of the impedance type.

In achieving this object, detection of the modulated signal in an impedance-type flow sensor is realized in a phase detector in which output from a sensing electrode or electrodes ("sensed" signal) is amplified to yield an amplitude-limited signal especially in a comparator, and in which that signal is combined with a square-wave reference signal in a gating or AND-ing circuit. The output is either a train of output impulses of excitation frequency (when the inputs to the gate are in phase) or suppression of the signal output (when those inputs are out of phase). Trains of output impulses alternate with signal-interruption intervals as the position of the flow-activated rotor changes in relation to the sensing and excitation electrodes. This output, filtered or unfiltered, is a phase-detected flow-representing signal. Filtering merges each train of output impulses into a vane-representing pulse. This aspect of the present invention is disclosed in my application Ser. No. 215,524 (supra).

In the form of liquid impedance flow detector detailed in my '254 application and herein, the signal that represents liquid flow is derived from a sensing electrode between opposite poles of an a-c excitation field, in an arrangement where the sensing electrode is more exposed to one and then to the other pole of the excitation. The phase of the sensed signal input to the detection circuit undergoes reversals as the flow-activated rotor turns. The output is phase-detected in a gating circuit.

In a related form of flow detector detailed below, the liquid-impedance responsive electrodes include a pair of sensing electrodes arranged symmetrically in relation to an excitation electrode. The liquid impedance is varied by a flow-driven rotor so that first one and then the other of the sensing electrodes has dominant exposure to the common excitation electrode. The sensed signals retain a fixed phase relation to each other and to a reference signal from the excitation source. The sensed signals vary in amplitude, their relative amplitudes reversing as the rotor turns. The sensed signals are applied to a differential input-comparison device having an inverting input and a noninverting input. A comparator is especially effective for this purpose, being an open-collector differential amplifier. The output of the differential comparison device, in response to the amplitude reversals of the sensed signals, is a phase-reversing signal. As in the flow detector detailed in my '254 application, this signal is gated with the phase reference signal, and with the same result. The gated output consists of trains of excitation frequency impulses alternating with signal-suppression gaps, and it is converted by filtering into flow-representing pulses. Because the signals from the two sensing electrodes are used as opposite inputs to the differential comparison device, commonmode spurious input (such as 60 Hz pick-up) is largely, if not wholly, self-canceling. Remarkably, the sensed signals that vary in amplitude reversely in relationship to each other are converted into a phase-reversing signal. As will be understood from the discussions below of illustrative apparatus having feedback loops, a "negative" long-time-constant feedback loop adjusts bias in the differential input device in the sense of correcting operation of the apparatus for sustained offset of input signal and circuit imbalance in producing gated flow-representing output.

In a modification, one of the two sensing electrodes is omitted and, instead, the omitted sensed signal is replaced by a constant-amplitude signal of the same phase. Its amplitude is partway—ideally midway—between the estimated minimum and maximum amplitudes of the signal from the retained sensing electrode. As in the flow sensor having two sensing electrodes, the output signal phase of the differential comparison device reverses repeatedly as the amplitude of the sensing electrode's signal alternately exceeds or is less than that of the constant-amplitude input signal.

This modification sacrifices certain advantages of the liquid flow sensor having two sensing electrodes, but the simplification that results from omitting one of these electrodes may justify the modification.

Both the configuration of a phase-reversing signal from a single sensing electrode and the configuration of amplitude-varying non-phase reversing sensed signals from two sensing electrodes are subject to a latitude of detrimental influences. For example, a phase-reversing type of flow sensor can become non-phase-reversing in case of substantial asymmetry. Similarly, where the relative amplitudes of two sensed signals are supposed to alternate in representing liquid flow, one of the signals can remain dominant continuously in case of substantial asymmetry. It is shown below that a negative feedback long-time-constant loop enables the differential comparison device that receives the sensed signal(s) to provide the phase gate with the required signal that is to be combined with the reference signal despite such electrode asymmetry. The feedback loop also maintains high sensitivity of the circuit to the sensed signal(s) despite electrical unbalance that may be present in the circuit, including differences in the inputs of the differential comparison device itself. The feedback loop achieves these purposes by appropriately adjusting the bias of one input in relation to fixed bias at the other input.

Inasmuch as a vaned rotor creates the impedance variations, the sensed signal is prominently different when a pocket of the rotor (between successive vanes) allows direct exposure of a sensing electrode to an excitation electrode, as compared to the signal produced when a high-resistivity vane of the rotor serves as an insulating barrier that partially shields a sensing electrode from an excitation electrode.

Flow detectors are commonly used for monitoring the flow of tap water whose resistivity is relatively high (but lower than the resistivity of the rotor). Liquid impedance flow detectors may be used in monitoring the flow of low-resistivity liquid (due to high ion concentration in the liquid.) Ostensibly, the increased contrast between the resistivity of the rotor's vanes and that of low-resistivity liquid should aid in the flow detection process. However, under conditions of very low liquid resistivity, liquid impedance flow detectors of this kind have been known to become inoperative. The sensed signal(s) drop to low value(s). The feedback loop on the differential comparison device has been found effective in maintaining stable flow-monitoring operation of the apparatus when used in low-resistivity liquid.

The wave-form of the detected output that results from gating the sensed and reference signals may not be a simple wave for each vane and pocket passing the electrodes. Instances of distorted waves occur, particularly a double-humped wave having a main hump and a smaller one. Such a wave leads to the danger of producing two flow-indicating counts for each passing vane. The long-time-constant negative feedback loop on the differential comparison device has been found effective to "clean up" the output, probably by suppressing the smaller hump.

Still further, the provision of the long-time-constant negative bias-adjusting feedback loop on the differential input device, especially a comparator, adapts the apparatus to use with still other electrode configurations as more fully described below. For example, a single sensing electrode in an excitation field that develops non-phase-reversing variable amplitude excursions can serve in a circuit that is designed for response to two non-phase-reversing signals that vary in amplitude reversely in relation to each other.

Flow detectors of the form having a single sensing electrode that produces phase-reversing output have the advantage of being operable with remarkably low excitation power. The required excitation signal may be only a few tenths of a volt. Where high sensitivity to weak sensed signals is achieved with a differential input device provided with a long-time-constant negative feedback loop, that high sensitivity makes it feasible to reduce the required excitation signal voltage to conserve battery energy.

With two exceptions, the single sensing-electrode type of flow detectors described in detail below do not involve a comparison between two input signals. Therefore, it is not necessary to use a differential comparison device for the sensed signal in most flow detectors having only one sensing electrode. Where the sensed signal is weak, a high-gain amplifier would serve. However, when the feature of negative feedback is used, the amplifier should have a bias-dependent switching characteristic. Indeed, where a comparator is used having only one input signal in this type of apparatus, it acts essentially as a high-gain amplifier arranged to have a bias-dependent switching point.

My application Ser. No. 215,524 describes and claims a multiple-rotor flow-sensing probe. Flow detectors incorporating such multiple-rotor probes are improved in my applications Ser. Nos. 427,611 and 467,138, and still further improvements are outlined above. A multiple-rotor flow sensing probe incorporating various features outlined above is improved by providing different frequencies for excitation and phase-reference for each of the multiple rotors, to better assure mutual isolation between the circuits related to the respective rotors.

It is contemplated that a rotor of metal may be used for causing appropriate distortions of the excitation pattern as the rotor's blades or vanes sweep past the sensing electrodes. In exemplary illustrative examples below, the rotor is of high resistivity material (compared with the resistivity of the liquid) and the electrodes are in a configuration such that a common electrode (an excitation or a sensing electrode) is alternately shielded from, and exposed to, one electrode of a pair (sensing electrodes or excitation electrodes) while, conversely, the common electrode is alternately exposed to, and shielded from, the other electrode of the pair. Only partial shielding is needed.

Each of the foregoing flow detectors, as described, includes a flow-activated turbine-type rotor. Signals are developed at a single sensing electrode or at a pair of sensing electrodes as a result of vanes or the rotor passing by the excitation and sensing electrodes. While vanes of a rotor are presently regarded as most suitable, there are known alternatives wherein flow-activated sensed elements can be adapted to present purposes as substitutes for a vaned rotor. For example, a flow metering device is known in which a lightweight ball is induced to orbit in a circular liquid-flow passage past a flow detector. Such a ball can be made of the same high-resistivity material as the vaned rotor and utilized for cyclically distorting the excitation current path in the liquid in the region of the sensing and excitation electrodes. The vanes of a turbine rotor and the orbital ball and equivalents which are arranged, in common, to vary the output at a sensing electrode or at a pair of sensing electrodes in the described flow detectors are referred to herein generically as "orbital flow trackers" or "flow trackers".

The nature of the invention and further novel features and advantages will be better appreciated from the following detailed description of various illustrative embodiments of the invention, these being shown in the accompanying drawings.

In FIGS. 1–5, probe 10 has two rotors 12 and 14 and includes a mounting structure consisting of supporting tube 16, a top support 18 and a bottom support 20, and tubes 22 and 24 that act with supports 18 and 20 as a frame for supporting the rotors.

Top support 18 comprises an inverted cup 26 formed of molded plastic providing partial sockets for tubes 22 and 24. Metal tube 16 extends into inverted cup 26 through the end wall of the cup. Electrode 28 (a sensing electrode in FIG. 7) has its lower end exposed and is close to rotor 12. A mass of rigid potting material 29, such as epoxy resin fills the cup. The potting material provides electrical insulation, it unifies tube 16, tubes 22 and 24 and electrode 28, and it is largely immune to deterioration when exposed to the fluid in the pipe which is considered to be tap water in this discussion.

Lower support 20 is conveniently formed of two channels of plastic 30 (FIG. 2) with their edges in abutment, forming a cavity. Tubes 22 and 24 extend through the upper channel and are locked in a mass of rigid potting material 31 such as epoxy resin that fills the channels. Electrode 32 is also locked in the potting material and has its upper end exposed and close to rotor 14.

Figures 7, 8:
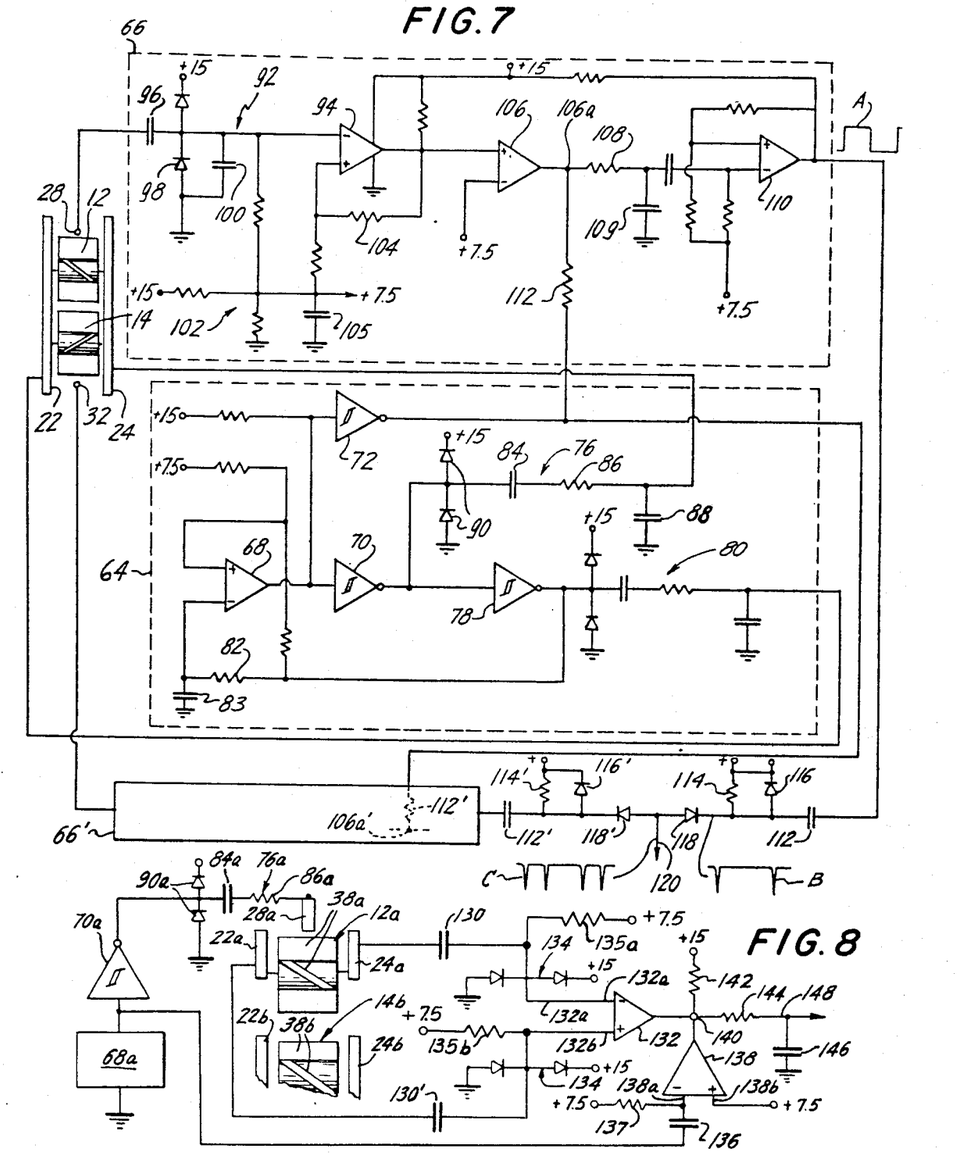
FIG. 7 is a diagram of the probe of FIGS. 1–5 and a novel circuit for developing a train of flow-representing pulses.
FIG. 8 is a diagram of a modification of the flow-sensing probe of FIGS. 1–5 and a modification of the circuit of FIG. 7.

As will be seen, tubes 22 and 24 serve a structural role but they also constitute electrodes (excitation electrodes in FIG. 7). An insulated wire 32' extends from electrode 32 through the hollow of one of the tubes, and out through cup 18, a hole in tube 16, thence upward and out of tube 16. Insulated wires 22' and 24' are connected to tubes 22 and 24 and they extend through holes in tube 16 to emerge from the upper end of the probe. Insulated wire 28' is connected to electrode 28 and extends out of the probe via tube 16. Electrodes 22, 24, 28 and 32 should be made of conductive material immune to attack by the fluid, such as brass or stainless steel where the sensed fluid is tap water.

Each of the rotors 12 and 14 has a shaft (not shown) extending into suitable bearings 33 in tubes 22 and 24. Making these bearings of graphite including sapphire thrust bearings promotes nearly friction-free rotation and long life. The blades or vanes of the rotor extend from a hub. They may be spiral-shaped and their leading and trailing edges are thinned, being in many respects like true turbine blades. Between the thinned extremities 34, 36, the blades may have appreciable thickness and the longitudinal edges may have distinct width, for example 0.025 inch for a rotor of 0.800 inch diameter with a hub of 0.200 inch diameter and 0.45 inch long. These edges sweep opposite electrodes 28 and 32, for example 0.125 inch diameter, with a clearance of 0.040 to 0.050 inch from the path of the rotor-blade edges. Electrodes 22 and 24 in an example are ⅛-inch (outer diameter) tubes with the tube axes spaced 0.67 inch apart.

In this connection, further dimensions may be of interest. The diameter of the hole in the wall of the pipe through which the probe of the above example is to be inserted may be 0.9 inch. A probe-carried four-blade rotor with its diameter of 0.80 inch and 0.45 inch length can be inserted in the 0.9-inch hole if necessary by positioning the rotor blades at 45° to the length of the probe. The vanes or blades of the two rotors form spirals of mutually opposite sense or, more simply, they slope oppositely in relation to the fluid path, causing opposite directions of rotation. The outermost edge of a blade may slant 30° to a plane containing the rotor axis and intersecting the outermost edge of the blade.

Figure 1:
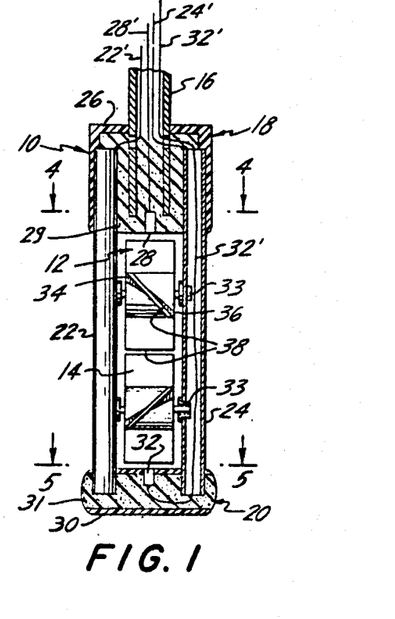
FIG. 1 is an elevation, partly in cross-section, of a flow-sensing probe useful in novel flow detectors.
Figure 2:
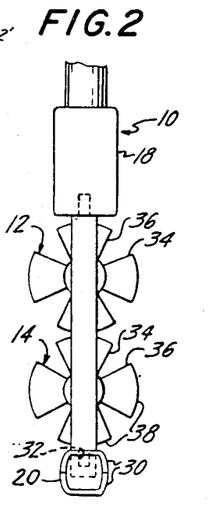
FIG. 2 is a side elevation of the probe shown in FIG. 1 as seen from the left.
Figure 3:
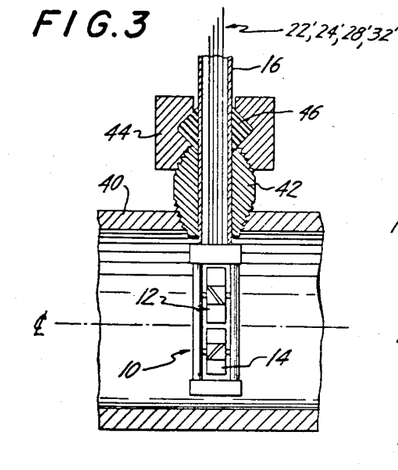
FIG. 3 illustrates the probe of FIG. 1 installed in a pipe, portions being shown in cross-section.
Figure 4:
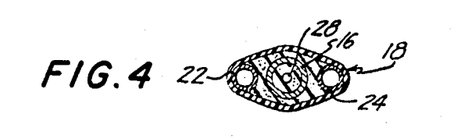
FIGS. 4 and 5 are cross-sections of the probe of FIG. 1 when viewed from the planes 4—4 and 5—5 of FIG. 1.

As seen in FIG. 3, rotors 12 and 14 when optimally installed are disposed symmetrically at opposite sides of the centerline C/L of pipe 40 whose cross-section is a circle. A hollow plug or stub 42 has pipe thread that serves as a closure, sealing the probe-mounting hole in the wall of pipe 40. Tube 16 extends into the pipe, through stub 42 and to an external clearance position where wires 22', 24', 28' and 32' are accessible. Clamp 44 that threads onto stub 42 tightens gasket 46 against tube 16 to form a water-tight seal.

Figure 5:
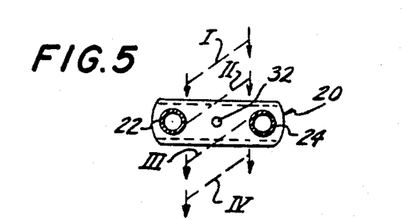

In FIG. 5, a representative turbine blade is shown in broken lines, in four successive positions I, II, III and IV that are assumed during continued operation of rotor 14. The water represents a volume through which current flows due to excitation of electrodes 22 and 24 in the embodiment of FIG. 7. The turbine blade is of polysulfone or polypropylene or special grades of nylon or other insulation whose resistivity is higher than that of tap water. The nylon resistivity is from $10^{11}$ to $10^{14}$ ohm-centimeters, and the other materials have still higher resistivities. The rotor blade in positions I and IV has little effect on the electrodes (The successive blades of the rotor passing the electrodes cause repetitions of the operation described for this blade, presuming wide separation of the blades, 90° in this embodiment.) In position II, the blade acts as a barrier in the distributed current paths through the water between electrodes 22 and 32, at which time the coupling between electrodes 24 and 32 is at a maximum. The reverse couplings prevail when the blade is at position III.

FIG. 7 shows details of a novel circuit for developing flow-representing signals using the probe of FIGS. 1–5.

Source 64 provides square-wave excitation for energizing electrodes 22 and 24, at 10 to 40 kHz, for example. It also provides a reference signal for each of the two identical detectors 66, 66' whose inputs are connected to sensing electrodes 28 and 32, respectively.

Source 64 has a high-gain open-collector comparator 68 connected to two identical inverting Schmitt triggers 70 and 72. The square-wave output of trigger 70 is connected via protective circuit 76 to electrode 24. The output of trigger 70 also drives an identical inverting Schmitt trigger 78 whose square-wave output is connected via a circuit 80 (the duplicate of circuit 76) to electrode 22. A feed-back path including series resistor 82 and shunt capacitor 83 extends from the output of trigger 78 to the (−) input of comparator 68, for developing square-wave oscillation. Protective circuit 76 includes a series capacitor 84, a series resistor 86 and a shunt capacitor 88 which are, for example, 0.1 Mfd, 1.0 k ohms, and 220 pf, and diodes 90. This circuit 76 provides protection for the solid-state devices of the circuit against damage due to external pulses.

Detector 66 includes an input protective circuit 92 that couples electrode 28 to the (−) terminal of comparator 94. Circuit 92 here includes coupling capacitor 96 that blocks D.C. and spurious low frequencies, diodes 98 that bypass high spikes, and small capacitor 100 that bypasses spurious high frequencies. Comparator 94 has an open collector, so that it tends to switch abruptly between low and high output levels. Resistor 104 provides positive feed-back, providing hysteresis to ensure positive switching and to suppress oscillation. Bias network 102 provides bias for the (+) and (−) inputs. The bias network also provides "+7.5" volts for other parts of the circuit, filtered by by-pass capacitor 105.

The output of comparator 94 drives comparator 106, at times providing a signal of oscillator frequency to series resistor 108 and shunt capacitor 109, an integrating filter circuit. Schmitt trigger 72 provides a reference square wave to the open collector of comparator 106, through load resistor 112. Whenever the outputs of trigger 72 and comparator 106 are both instantaneously "high", the output point 106a is high. If either of these outputs is "low", output point 106a is "low". With this assumed phase relationship, output point 106a is switched high and low at oscillator frequency. This in-phase switching of comparator 106 and trigger 72 occurs when the signal of one excitation electrode, 22 for example, predominates at sensing electrode 28 over the oppositely phased signal at the other excitation electrode 24. As rotor 12 turns, a blade causes the input from electrode 24 to predominate at sensing electrode 28. That causes the oscillator-frequency condition of the open collector of comparator 106 to be out-of-phase with Schmitt trigger 72. In that condition, the potential at point 106a is low when the Schmitt trigger is low, and the potential of point 106a remains low when the collector of comparator 106 is "low" even though Schmitt trigger 72 could support a "high" output at the open collector of comparator 106. Recapitulating, when the signal from one excitation electrode (22) at electrode 28 predominates over the signal from the other excitation electrode (24) due to the position of a rotor blade, a signal of oscillator frequency appears at point 106a and it disappears when the rotor blade reverses the predominant oscillator signal at electrode 28. Comparator 106 with its circuit connections to sensing electrode 28 and the square-wave excitation source thus serve as gating or AND-ing means to combine the sensing and excitation signals so as to yield trains of impulses or impulse-interruption intervals in dependence on the phase relationship of the compared signals. The signal output of comparator 106 is gated or AND-ed by application of the signal via resistor 112 so that oscillator-frequency signals appear only when both signals are "high", otherwise being mutually canceling. Integrating filter circuit 108, 109 converts the on-off signals of oscillator frequency at point 106a to square waves, one for each blade passing electrode 28.

The square waves coupled to comparator 110 appear at the output of detector 66 as sharpened square waves. They are applied to a differentiating circuit comprising series capacitor 112 and shunt resistor 114. Diode 116 eliminates pulses of one polarity that result from differentiating the train of square-waves from detector 66, leaving a train of sharp spikes that represents rotor blades passing sensing electrode 28. Detector 66' responds in like fashion to signals from sensing electrode 32, producing square-wave output that is converted in network 112', 114' and 116' into a train of sharp spikes. The two trains of spikes are coupled by "OR" gate diodes 118, 118' to combined output line 120. This signal C represents the operation of both rotors/sensors 12/28 and 14/32.

There is a possibility that two spikes derived from different detectors 66, 66' could appear as one at output line 120, each masking the other. Any such possibility is reduced to a very low order by designing the differentiator 112/114 to make the spikes of the two trains sharp and of extremely short duration as contrasted to the time interval between successive spikes of either train even at the upper limit of the flow rates being monitored.

The signal from output line 120 shown in FIG. 7 is supplied to utilization means (not shown), providing a measure of the volume of flow, or the output signals of the rotation sensors as variously processed can be used in a rate-of-flow measurement circuit, or those signals can be used as a factor to be multiplied with a temperature-difference signal in measuring heat units delivered to a room or other heat-utilization unit.

In the flow sensor of FIG. 7, each flow detecting circuit uses a single sensing electrode and oppositely phased signals for excitation electrodes 22 and 24, providing sensed-signal excursions that swing oppositely with reference to ground. Comparator 94 serves as a high-gain peak-limiting amplifier, being high whenever its input exceeds the bias at its other input terminal. Source 64 produces a square-wave excitation for electrodes 22 and 24, but a-c excitation of other waveforms functions nearly as well.

FIG. 8 shows a flow sensor similar to that of FIGS. 1–5 and 7 together with another energizing and detecting circuit. The flow sensor apparatus of FIG. 8 incorporates certain of the novel features of the apparatus of FIG. 7 and includes further features In FIG. 8, a flow sensing probe is shown having two flow-activated rotors 12a and 14b in all respects like rotors 12 and 14. Rotor 12a is supported for rotation between metal tubes 22a and 24a while rotor 14b is supported for rotation between metal tubes 22b and 24b. Tubes 22a and 22b are unified by an insulating rod (not shown) while tubes 24a and 24b are unified by another insulating rod. The unified metal tubes 22a, 22b and 24a, 24b are supported in the same manner as tubes 22 and 24 in FIGS. 1–5. An electrode 28a is supported by insulation, like electrode 28. The illustrative dimensions of the parts in FIGS. 1–5 are suitable for correspondingly numbered parts in FIG. 8.

A further electrode (not shown) is part of the probe of FIG. 8 corresponding to electrode 32, correspondingly located and supported. While the probe of FIGS. 1–5 is usable in a conduit of either metal or plastic, the probe represented in FIG. 8 requires a further electrode, represented by ground in FIG. 8. That electrode physically may be a portion of metal tube 16 exposed to the liquid or the excitation-return may be provided by pipe 40, when a metal pipe is used. Indeed, sensing electrodes 22a, 24a with input couplings 130, 135a and 130', 135b contribute to the excitation-return.

FIG. 8 shows an effective circuit for the electrodes associated with rotor 12a. A duplicate circuit (not shown) may be used for the electrodes of rotor 14b, and the outputs of the two circuits may be combined and supplied to signal-utilization means as described in connection with FIG. 7.

In FIG. 8, a square-wave source 68a (like the oscillator in source 64) is coupled via inverting Schmitt trigger 70a to electrode 28a while the ground connection of the oscillator is connected to pipe 40 or tube 16. This sets up a conduction pattern in the liquid, with an electric field gradient becoming progressively more concentrated near electrode 28a.

Electrodes 22a and 24a assume the potential of the field in which they are disposed. Their circuit connections are insulated from the liquid. These electrodes are coupled via d-c isolation capacitors 130, 130' to input electrodes 132a and 132b of an open-collector comparator 132. These input electrodes have pairs of spike-protection diodes 134, and resistors 135a and 135b provide stable bias at a common value, e.g., 7.5 volts, as in the bias network of comparator 94 of FIG. 7.

Square-wave source 68a is coupled via capacitor 136 to comparator 138. Input terminal 138a is connected to the half-voltage terminal of the d-c energizing supply via load resistor 137, while input terminal 138b is connected directly to the same half-voltage point. The collectors of comparators 132 and 138 are joined at terminal 140 which extends to the positive d-c energizing terminal via load resistor 142.

In operation, sensing electrode 22a is at times partly shielded from excitation electrode 28a by a vane or blade 38a of rotor 12a that serves as a barrier and at other times electrode 28a is exposed to sensing electrode 22a. Stated otherwise, the excitation field developed between the pipe and excitation electrode 28a is alternately impeded and freed in the region of sensing electrode 22a as the vaned rotor is driven by liquid flow. Conversely, sensing electrode 24a is alternately exposed freely and shielded from the excitation field near electrode 28a as the same blades of the rotor sweep past the sensing and excitation electrodes, like electrode 32 in FIG. 5. Comparator 132 develops enormous amplification of the difference between the potentials at its inputs. Its output switches off and on—low or high—depending upon which of its input terminals has the greater potential. The polarity of excitation electrode 28a reverses at the oscillator frequency. For example, this may be 10 kHz to 80 kHz, typically 40 kHz, a frequency that is several or many times the frequency at which the rotor blades pass the excitation electrode. The output of comparator 132 is a square wave whose phase is dependent upon which of the sensing electrodes 22a, 22b is more directly exposed to the excitation electrode when that electrode has positive excitation. However, the phase of the signal input does not change. Notably, comparator 132 responds to like-phase input from electrodes 22a and 24a by producing output that is either in phase with or out of phase with the reference signal of comparator 138, depending on which input 132a or 132b has the greater applied signal. (This contrasts with FIG. 7 wherein the input signal to comparator 94 undergoes phase changes as the rotor turns).

Comparators 132 and 138 have open collectors and they have no negative feedback. Their common output terminal is high only when neither of these comparators drives its output low. Thus, depending on the phase of pulses from comparator 132 in relation to the "on" times of comparator 138, a series of positive-going inpulses of oscillator frequency does—or does not—appear at junction 140. These positive trains of impulses are converted by the low-pass filter represented by series resistor 144 and shunt capacitor 146 to develop square-wave flow-representing pulses at terminal 148, one pulse for each vane that sweeps past the electrodes. This signal can be used variously, as in a volume-of-flow indicator or in a rate-of-flow indicator or other utilization device (not shown). The output can also be combined with that of a like signal-generating circuit associates with like electrodes assembled to rotor 14b.

In contrast to the circuit of FIG. 7, the circuit of FIG. 8 has two sensing electrodes in the flow sensor. As a result, the output of comparator 132 depends on the difference between the signals from pick-up or sensing electrodes 22a and 24a. Consequently the circuit rejects common-mode signals, 60 Hz pick-up being a prominent example. An input filter (or filters) at the comparator 132 may be omitted as unnecessary, and stable operation is realized with very weak signals. The apparatus of FIG. 8, and the similar apparatus of FIG. 6 to be described, operate where the resistivity of the liquid becomes very low.

Figure 6:
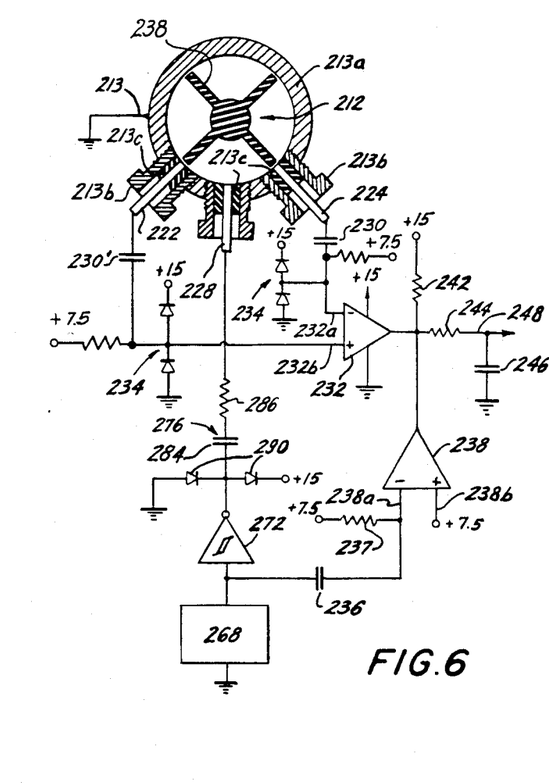
FIG. 6 is a diagram of an in-line flow detector including a novel circuit for providing flow-representing signals.

The circuit of FIG. 8 is used in FIG. 6 with a specifically different configuration of sensing and excitation electrodes, but they operate alike and have common properties. Numerals in FIG. 6 are of the "200" series for corresponding parts in FIGS. 1–5 bearing "00" series numerals and for corresponding parts in FIG. 8 bearing "100" series numerals.

FIG. 6 illustrates an in-line flow sensor, as distinguished from the probe sensor of FIGS. 1–5. Metal pipe 213a represents one excitation electrode 213, and rod 228 represents the opposite excitation electrode. Rods 222 and 224 are sensing electrodes. All three rods are supported in holes in the wall of the pipe by bushings 213b, separated from the bushings by water-tight electrical insulation 213c. Rotor 212 is of high resistivity insulation, like rotor 12, of the same material and dimensions. Rotor 212 has vanes or turbine-like blades 238 that sweep close to the ends of rods 222, 224 and 228 as described in detail in my '354 patent (supra). The description of the electrodes, pipe and rotor in that patent is incorporated here by reference.

The circuit in FIG. 6 duplicates that in FIG. 8, and for that reason the description of the circuit and its operation are not repeated in detail here. Comparator 232 has input connections to two sensing electrodes. Sensing electrode 222 is alternately exposed to excitation electrode 228 (when these electrodes are in a pocket between vanes 238) or they are shielded from each other by the barrier effect of an interposed vane 238. Sensing electrode 224 is similarly exposed to or shielded from excitation electrode 228, but the exposure of each sensing electrode occurs while the other is shielded, and vice versa. In this respect, FIGS. 6 and 8 are much alike. And—also in common with FIG. 8—the apparatus of FIG. 6 has the alternately more/less excited sensing electrodes connected to the two input terminals of the comparator. The apparatus operates to represent the flow of liquids whether the liquid resistivity is high or very low, and it responds to fractional volt input signals, with excellent common-mode rejection properties.

Figure 8A:
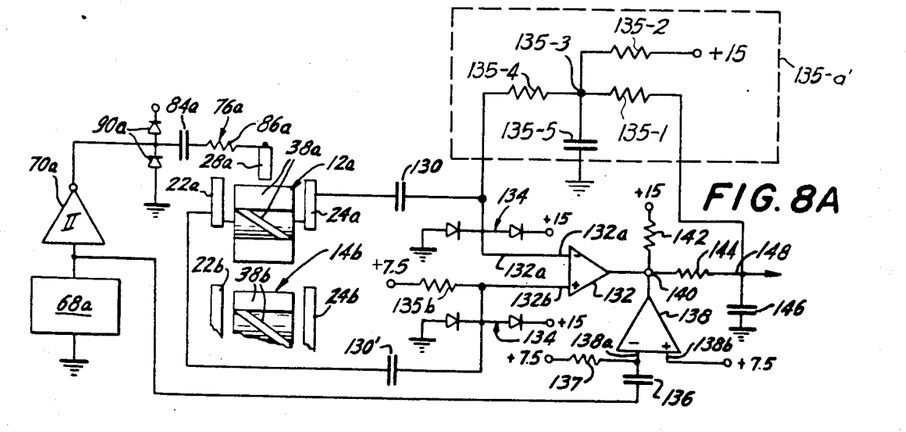
FIGS. 8A, 8B and 8C are modifications of the flow sensor shown in FIG. 8.

FIG. 8A is a modification of FIG. 8, being a duplicate in all respects except that bias resistor 135a in FIG. 8 is replaced by a negative feedback loop 135a' in FIG. 8A. Apart from the feedback loop, both circuits function alike, their parts bear the same numerals, and the operation of FIG. 8A is the same as that described above in connection with FIG. 8 except as noted hereinafter.

Negative feedback loop 135a' comprises a pair of resistors 135-1 and 135-2 connected to each other at junction 135-3; and the series-connected resistors are connected between the positive d-c supply terminal (+15) and the output junction 148. Resistor 135-4 couples the bias of junction 135-3 to the (−) input of signal comparator 132. Capacitor 135-5 is connected between junction 135-3 and ground. (Resistor 135-1 may be connected to junction 140, the unfiltered gating or ANDing output point of comparators 132 and 138. However, because capacitor 135-5 is electrolytic and high-frequency pulse trains appear at junction 140, the illustrated circuit is preferred.)

Resistors 135-1 and 135-2 and capacitor 135-5 have large values. In an example, these are approximately 5 and 10 megohms and 10 Mfd., respectively, and capacitor 135-5 is of low-leakage design. Accordingly, the time constant of the feedback loop is quite long. Resistor 135-4 in this example is 100,000 ohms; but since it does not carry capacitor-charging or -discharging current, it does not affect the time constant. In this example, comparators 132 and 138 are National Semiconductor type LM393, the d-c supply is 15 volts and the bias at the (+) input 132b via resistor 135b is 7.5 volts. Also, resistor 144 is 100,000 ohms, negligably small compared to resistor 135-1 in this example.

It may be considered that the power is turned on but that no signals are applied to inputs 132a and 132b of the signal comparator 132. Also, at this time let it be considered that the output of comparator 138 is not clamped low and therefore junction 140 can rise above d-c ground potential and it can even approach +15 volts via resistor 142. (This condition of junction 140 is satisfied in normal operation in the intervals when the inverting (−) input of comparator 138 receives negative signal excursions.)

Because resistor 135-1 is smaller than resistor 135-2 and both of these resistors form a simple series d-c path between +15 volts and the output 140 of signal comparator 132, that comparator must develop an output, on the average, so that the bias provided by the negative-feedback loop 135a' at the (−) input 132a is very close to the bias at the (+) input 132b. The output voltage of signal comparator 132 (measured at junction 140) when capacitor 135-5 is charged to provide this equilibrium bias at the (−) input 132a averages 3.75 volts with a 15-volt d-c supply, where the resistance of resistor 135-1 is half that of resistor 135-2, disregarding the resistance of resistor 144. Thus, 7.5 volts is developed across resistor 135-2, 3.75 volts is developed (on average) across resistor 135-1, and junction 140 is at an average of 3.75 volts above ground at equilibrium. The bias provided at input 132a under these conditions may be called the "d-c equilibrium bias."

In operation of the apparatus of FIG. 8A, square-wave excitation is developed in source 68a and applied to (−) input 138a of the reference comparator 138. Inverting Schmitt trigger 70a couples the square-wave excitation signal to excitation electrode 28a. Let it be considered that signal excursions of constant amplitude (not necessarily equal excursions) are developed at sensing electrodes 22a and 24a and applied during a protracted period to the (+) input 132b and the (−) input 132a of sensed signal comparator 132. (This condition prevails when rotor 12 is at rest.) Only the positive sensed-signal excursions require consideration with the circuit shown, when negative half-waves are applied to the (−) input of reference comparator 138. (No attention is needed for the positive signal excursions at (−) input 138a since, at those moments, junction 140 is clamped low or virtually at ground potential by comparator 138.) Over a long period (when rotor 12 is at rest) comparator 132 operates basically the same when signals are supplied to its inputs as when there is no signal input. No flow-representing pulses develop at junction 148. Comparator 132 operates so that the bias developed by loop 135a' at (−) input 132a is a value such that the positive bias at (+) input 132b increased by the applied positive signal peak is virtually equal to the positive bias at (−) input 132a increased by its concurrently applied positive signal peaks.

Three conditions of input signals may be analyzed. (A) If the positive peaks of the signals applied to the inputs 132a and 132b are precisely equal, the same behavior of signal comparator 132 develops as in the case of no signal input, as discussed above. The bias developed for input 132a by the bias feedback loop 135a' is the d-c equilibrium bias. (B) If the positive-going peak signal input to the (+) input 132b is higher than that at the (−) input 132a during a protracted period, then at equilibrium the bias provided at (−) input 132a by the feedback loop rises above the d-c equilibrium bias by a small but finite amount. The sensed-signal comparator 132 operates in such a manner that the totals of bias plus signal peaks at inputs 132a and 132b have the same relationship as in the case of no signal input. (C) If the positive-going peak signal input to the (−) input 132a is higher than that at the (+) input 132b during a protracted period, the bias provided by feedback loop 135a' drops below the d-c equilibrium bias by a small but finite amount. As in condition (B) above, the comparator operates in such a manner that the totals of bias plus signal peaks at inputs 132a and 132b have the same relationship as in the case of no signal input.

In considering the circuit operation, it may be helpful to note that, in practice, the input signals are small compared to the 7.5 volt bias at input 132b. The peak-to-peak voltage to produce the a-c excitation field may be 15 volts, yielding typical sensed signals of about one-tenth of that voltage. Further, practical forms of the apparatus operate well at much lower excitation voltages.

The end result of constant-amplitude sensed signals appearing over a protracted period at the inputs of sensed-signal comparator 132 is that the bias provided for the (−) input 132a by the feedback loop 135a' is equal to the d-c equilibrium bias for balanced sensed signals or that bias becomes adjusted up or down from the d-c equilibrium bias when unbalanced signals are applied to inputs 132a and 132b. Schmitt trigger 70a introduces decoupling between reference input 138a and excitation electrode 28a. If device 70a were non-inverting, the negative half-waves of the sensed signal would have essentially the same effects as the positive half-waves of sensed signal in the above discussion.

In normal operation of the flow sensor, the rotor turns and the positive-going impulses to the (+) and (−) inputs change as the rotor vanes variably distort the excitation field. Such rapid variations are in a sense recognized in the sensed signal comparator to the extent that they deviate from the long-period unbalance (if any) of the input signals as represented by the biases (adjusted and fixed) of the inputs 132a and 132b of the sensed signal comparator. This comparator 132 operates virtually at the mean of the dynamic range of signal variations that occur due to the turning of the rotor. The d-c equilibrium bias develops at input 132a for symmetrical signal variations, subject to an off-set from the d-c equilibrium bias in case signal changes due to the turning of the rotor are added to a sustained signal due to asymmetry.

The flow sensor of FIG. 8 and the modification of FIG. 8A include two sensing electrodes that are affected in opposite senses as the rotor turns. The vanes of the rotor introduce shielding between the excitation electrode 28a and the sensing electrodes 22a and 24a in alternation. Where the liquid flows in a metal pipe, the pipe can serve as the ground return of the excitation source (as in FIG. 1). Other arrangements for the a-c return can be devised. However, it may be considered important to provide a flow sensor that can be used in metal or plastic pipe and which has a simplified electrode assembly and furthermore, which can utilize the features of FIGS. 8 and 8A. Such a flow sensor is shown in FIG. 8B, being optionally the same dual-rotor probe as in FIGS. 1–5.

Figure 8B:
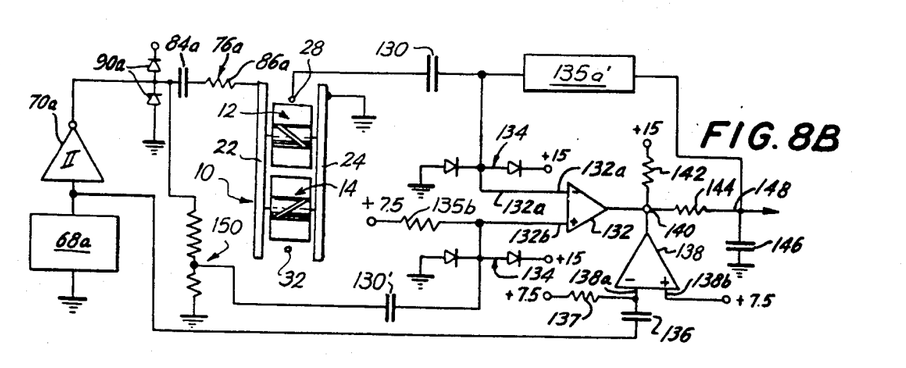

In FIGS. 8 and 8B, the same reference numerals are used for the identical parts, except that the numerals applied to the parts of the probe in FIG. 8B are the same as those of FIGS. 1–5. The operation of the apparatus of FIG. 8B is the same as that described in connection with FIG. 8, except as noted hereinafter.

In FIG. 8B, the two metal posts 22 and 24 of probe 10 are used as an a-c excitation electrode and an a-c ground, respectively. An a-c current and field pattern is developed in the liquid between these excitation electrodes that affects sensing electrode 28 variably as vaned rotor 12 turns. In this way, a flow-representing train of square-wave pulses is impressed on the (−) input 132a in FIG. 8B, varying in amplitude as the rotor turns.

The flow sensors shown in FIGS. 8 and 8A include two sensing electrodes for comparator 132. In FIG. 8B, a substitute a-c signal is provided for (+) input 132b. This substitute signal has the same phase as the signal picked up by electrode 28. The substitute a-c signal is obtained from a voltage divider 150. As in FIGS. 8 and 8A, the amplitude difference of the signals at the (+) and (−) inputs of comparator 132 varies as the rotor turns but those input signals do not undergo phase reversals.

The signal voltage to the (+) input 132b in FIG. 8B is set at the mean of the amplitudes provided by electrode 28 as rotor 12 turns. Fixed bias is provided by resistor 135b for the (+) input 132b, while bias that is self-adjusting is provided by the same biasing negative feedback loop 135a' as shown in FIG. 8A and described above. (Carefully adjusted fixed bias could be provided for the (−) input 132a as in FIG. 8 instead of the biasing feedback loop, but the self-adjusting feature would be lost.)

Negative feedback bias loop 135a' in FIG. 8B is the same in construction and operation as feedback loop 135a' shown in FIG. 8A and described above. The fact that the signal to input 132b in FIG. 8B is a constant-magnitude signal narrows the range of the amplitude difference available to signal comparator 132. However, the electrode assembly is simplified as compared to that of FIG. 8A and therefore this modification may well be attractive.

In FIG. 8B, posts 22 and 24 also provide a-c excitation about electrode 32 for the second rotor 14, where two rotors are used as in FIGS. 1–5. A sensed-signal circuit for electrode 32 is to be provided, duplicating that of electrode 28.

As noted above, the electrode assembly of FIG. 8B can be used in plastic or metal pipes, since the probe incorporates a pair of opposite-pole a-c excitation electrodes.

Asymmetry of electrode 28a is discussed above in relation to FIG. 8A, and that discussion applies to FIG. 8B. Moreover, the same discussion applies to a still further variation in which the signal voltage provided by voltage divider 150 to input 132b (FIG. 8B) is reduced to zero and, consequently, voltage divider 150 is omitted. In that case, sensed signals are applied to input 132a, being constant when rotor 12 is at rest (no flow) and varying in amplitude as the rotor turns. The phase of the sensed signal in relation to the reference comparator 138 does not change as the rotor turns. In a sense, this variation of FIG. 8B represents an extreme case of asymmetry of electrodes in FIG. 8A. In such extreme condition, one electrode 22a or 22b is so far removed from excitation electrode 28a as to develop a lower sensed signal input when it is not shielded by a rotor vane than the sensed signal developed at the other sensing electrode when the latter is shielded by a rotor vane. Operation of this variant will be understood from the discussion of FIG. 8A above.

Figure 8C:
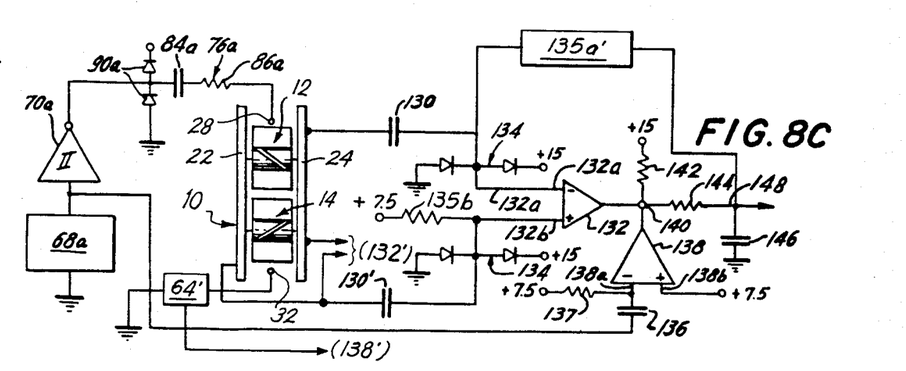

A modification of FIG. 8A is shown in FIG. 8C. The dual rotor probe of FIG. 8C may be that in FIGS. 1–5, so that the same part numbers are used for the probes in both of those figures. A metal pipe or other suitable a-c return for the excitation field is used with the probe of FIG. 8C.

In common with FIGS. 8 and 8A, signal comparator 132 in FIG. 8C has input from two sensing electrodes 22 and 24 that are connected to the comparator inputs 132a and 132b. These inputs receive in-phase signals whose relative amplitudes vary as the rotor turns. Depending on whether fixed bias is used for input 132a in FIG. 8C (as in FIG. 8) or the bias feedback loop 135a' is used (as in FIG. 8A) the apparatus of FIG. 8C has all of the advantages of the apparatus in those figures. However, the apparatus of FIG. 8C has a simpler and more rugged dual-rotor probe.

Sensing electrode 32 in FIG. 8C is coupled to a separate a-c excitation source 64' duplicating the a-c excitation means provided for electrode 28. Excitation source 64' is also coupled at 138' to a phase reference comparator or gate (not shown) and connections 132' are provided from sensing electrodes 22 and 24 to a signal comparator (not shown). The circuit of the sensed-signal and reference is the same for detection of flow at rotor 14 as that shown for flow detection at rotor 12. However, one excitation and phase-comparison frequency is used for flow detection at rotor 12 and a substantially different frequency is used for flow detection at rotor 14. For example, the frequency of oscillator 64a may be 10 kHz and the frequency of excitation source 64' may be 14 kHz. Therefore, even though sensing electrodes for both rotors 12 and 14 are used in common, the flow detection circuits for each rotor 12, 14 responds to its related excitation and phase detection frequency. Of course the frequencies chosen must be compatible, in the sense of avoiding beat frequencies that would simulate filtered flow-representing signals at junction 148.

In FIGS. 8, 8A, 8B and 8C, the phase comparator 138 serves to gate the output junction 140 off during alternate half-cycles of excitation. The input connections to comparator 138 could be reversed from that shown, and phase reference comparator 138 could turn junction 140 off during negative-going sensed signals to the signal comparator 132. Correspondingly, inverting Schmitt trigger 70a might be replaced by a noninverting Schmitt trigger or other coupling device but without changing the phase of reference comparator 138. Signal comparator 132 would respond in each case by having its output go high whenever the (+) input 132b is higher than the signal to the (−) input 132a.

In all of the foregoing embodiments, the signal applied to the excitation electrodes alternates in polarity. This excitation is developed in FIG. 7 by two trains of pulses that could polarize the excitation electrodes oppositely even if coupling capacitors were omitted. However, a-c electrode excitation is ensured by coupling capacitors in all of the embodiments. Such a-c excitation protects the electrodes from erosion due to electroplating action that would occur with most electrode materials were unidirectional pulses used for excitation. It should be noted, however, that the novel flow detectors would function with unidirectional-pulse excitation.

In FIG. 7, the polarity of each sensing electrode, e.g., electrode 28, reverses at the excitation frequency, its phase changing in relation to a reference phase in dependence on its exposure more directly to one or the other of the excitation electrodes. The phase of the single sensing electrode in FIG. 8B and the phase of the comparison or reference signal to input 132b do not change in relation to the phase of the excitation and of the phase reference gate. Also, the common phase of both sensing electrodes in FIGS. 8, 8A and 8C does not change in relation to the phase of the excitation and of the phase reference gate 138. In FIGS. 8, 8A, 8B and 8C, amplitude differences of the inputs to the signal comparator are converted into phase-significant output by signal comparator 132. In FIG. 8B and the modification wherein no signal is applied to input 132b, the single variable-amplitude sensed signal is converted into phase-significant output by comparator 132. Accordingly, all these embodiments use a phase-reference signal to convert the sensed amplitude-varying signal(s) into trains of excitation-frequency pulses separated by gaps, representing sweep of the rotor vanes past the electrodes.

The time constant for the feedback loop 135a' in FIGS. 8A, 8B and 8C can be calculated on the basis of capacitor 135-5 in series with an equivalent circuit of resistors 135-1 and 135-2 in parallel. The same feedback loop 135a' may well be provided in FIG. 6. For the values given, the time constant is:

$$R \cdot C = [(5 \times 10)/(5 + 10)] \cdot 10 = 33 \text{ sec.}$$

In an example, using a commercial size and design of flow sensor of the in-line type as in FIG. 6 (in contrast to the probe type of flow sensor as in FIGS. 1–5) the lowest flow rate to be monitored is about one gallon per minute; and at that flow rate in this example, the four rotor vanes (FIG. 6) pass the electrodes and produce pulses four times per second. The example of a 33-second time constant of the feedback loop is much longer than the ¼-second interval of the flow-representing pulses in this example. Among the factors entering into the determination of time constant are: the cost of the largest economical low-leakage capacitor, the design of the flow detector and its type (probe or in-line), and the slowest rate of rotor rotation in the linear range of the flow sensor. If the time constant is made too short, flow-representing output pulses could interfere with the stabilizing purpose of the feedback loop. Generally, a time constant of 10 to 100 seconds may be suitable. As already indicated, the actual time constant used will depend on a variety of considerations.

The choice of the excitation frequency affects the maximum rate of flow that can be detected dependably. Empirically, the minimum excitation frequency should be twenty times the maximum frequency of the demodulated signal, e.g. signals A, FIG. 7. In an example, using a rotor dimensioned as above, the frequency of the demodulated signals is 400 Hz at a maximum flow rate of 30 gallons per minute. Using the above empirical 20/1 ratio of excitation frequency to the frequency of vanes passing the sensing electrodes, the excitation frequency should be 10 kHz or higher.

Figure 9:
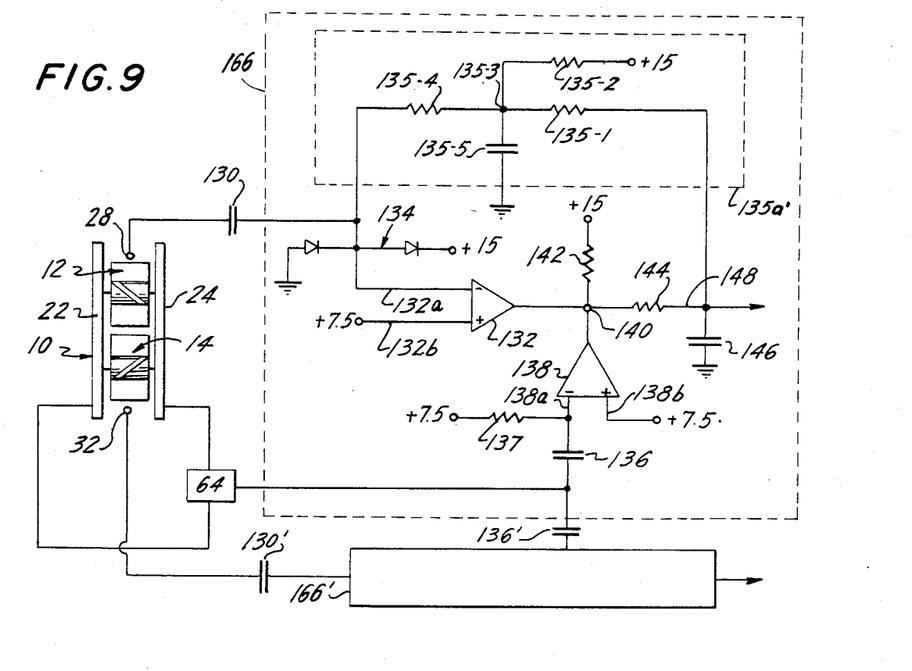
FIG. 9 is a modification of the flow sensor of FIG. 7.

FIG. 9 represents a modification of FIG. 7, both incorporating the flow sensing probe of FIGS. 1–5 bearing the same numerals. The probe comprises a single flow-sensing electrode for each rotor and a pair of a-c excitation electrodes symmetrically disposed at opposite sides of each sensing electrode. Accordingly, the phase of the signal at each sensing electrode undergoes reversals as each rotor vane sweeps past the electrodes as represented in FIG. 5. FIG. 9 also includes an a-c excitation source 64 like that in FIG. 7. Of course, the circuit of FIG. 9 may be used effectively for in-line flow sensors, represented by FIG. 6.

Flow-detection circuit 166, to a large extent, has the same interconnections and components as in FIG. 8A, so that the same numerals are used in those figures for corresponding parts. However, the two circuits operate quite differently in at least one respect. The sensing comparator of FIG. 8A has a pair of like-phased input signals whose relative amplitudes change, and the sensing comparator converts the input amplitude differences into in-phase or out-of-phase output relative to the phase-reference signal of comparator 138. In contrast, one input of comparator 132 shown in FIG. 9 receives a sensed signal whose phase reverses when the rotor turns, and the output of the comparator goes "low" or "high" corresponding to the phase changes. Comparator 132 of FIG. 9 does not have an amplitude-comparison phase-discriminating function. In FIG. 9, comparator 132 amplifies the input signal above a switching level, squaring and limiting the peaks. The output of comparator 132 at junction 140 is a train of impulses or an impulse-suppression interval in accordance with the reversing phase of the input.

As in FIG. 8A, the output of comparator 132 in FIG. 9 is gated or AND-ed with the phase-reference signal. The gating function could be performed by an AND logical circuit such as a diode AND circuit or open-collector operational amplifiers.

Negative feedback loop 135a' in FIG. 9 is connected between the (−) input of comparator 132 and a flow-representing output point 148 (or 140).

The operation of the apparatus of FIG. 9 will be understood from that of FIG. 8A, reviewed above. The effect of feedback loop 135a' in FIG. 9 is the same as in FIG. 8A with the power turned on and with no input signal to comparator 132. The above-mentioned d-c equilibrium bias develops at (−) input 132a, very close to the fixed bias at (+) input 132b.

When there is a sensed signal at input 132a, junction 140 tends to be "low" or "high" depending on the phase relation of sensed signal and the reference signal. The phase of the input to comparator 132 in FIG. 9, and the phase of its inverted output do not change when the rotor is at rest. The output remains in phase with—or out of phase with—the reference signal of comparator 138. The feedback bias becomes adjusted so that the sensed signal input to comparator 132, plus the feedback bias at (−) input 132a is very nearly equal to the bias at input 132b; and a stable potential develops at junction 148. There are no trains of excitation-frequency impulses at junction 140, separated by signal-suppression intervals When the rotor turns, the sensed signal normally goes through phase reversals that are translated into trains of excitation-frequency impulses separated by suppressed-signal intervals. These are equal in duration for symmetrical electrode configurations. The "duty cycle" shifts one way or the other (longer pulse trains and shorter gaps or the converse) in case of asymmetry. The feedback bias responds to the duty cycle, in that a sustained flow-representing condition of 50% duty cycle has a feedback bias equal to the d-c equilibrium bias, and duty cycles above and below 50% are accompanied by corresponding shifts from the d-c equilibrium bias.

In some electrode configurations, for example in some forms of the excitation and sensing electrode assembly and circuit represented in FIG. 6, with fixed bias at inputs 132a and 132b, it has been found that double-hump impulses develop at junction 148 for each vane that passes the electrodes, one hump being larger than the other. The risk arises that such output may be processed if there were two vanes for each double-hump output pulse. The feedback loop 135a' has been found effective to "clean up" the output wave-form, producing one output pulse at junction 148 for each passing vane.

It is possible for the electrode configuration to be so asymmetrical that the phase of the sensed signal does not reverse at any time in the sweep of a rotor vane past the electrodes. This condition is due largely to asymmetries of the electrode configuration and it is affected by the degree of shielding introduced between the sensing electrode and one of the excitation electrodes when the sensing electrode is directly exposed to the other excitation electrode. Excitation from one electrode (e.g. 22) may never overcome the effect of the other excitation electrode (e.g. 24) at the sensing electrode 28 regardless of the position of rotor 12. Consequently, the sensed signal at input 132a would not undergo phase changes as the rotor turns. The sensed signal would only vary in amplitude as the rotor turns. The circuit of FIG. 9 remains operative even under such conditions, in accordance with the modification of FIG. 8B discussed above.

An operational amplifier as well as a suitable form of high-gain amplifier could replace comparator 132 (noting that comparator 132 has only one sensed-signal input 132a). The long-time-constant negative feedback loop 135a' acts with the differential inputs of the sensed-signal comparator, to compensate for sustained asymmetries in signal provided by the probe. That loop 135a' establishes a quiescent point that maintains high sensitivity to sensed signals that may be less than 10 millivolts. The negative feedback loop 135a' extends the operating range of the flow detector in FIG. 9 to liquids whose resistivity is quite low.

The dual-rotor probe of FIG. 9 is equipped with a second flow-detecting circuit 166' for sensing electrode 32. Circuit 166' has a coupling capacitor 136' that provides the phase reference signal. There is virtually no interaction between the flow detection performed by each of the rotors and their related circuits.

In each of the flow detectors described above and shown in the drawings, a turbine-type rotor is utilized as the flow-activated device having vanes of insulation that sweep through the excitation pattern in the liquid at the sensing electrode(s). As indicated above, a ball of insulation in a known orbital-ball type of flow sensor can be used as a substitute for rotor vanes, when the ball is arranged to travel past the sensing and excitation electrodes of the described flow detectors. Both the ball and the rotor vanes move in an orbit. Similar flow-activated elements that oscillate with like effect are contemplated. Such flow-activated elements, mentioned above, are herein called flow trackers.

Variations in the foregoing illustrative embodiments and varied applications of the novel features thereof will occur to those skilled in the art and therefore the invention should be construed broadly in accordance with its full spirit and scope.

What is claimed is:

1. Flow-detecting apparatus including means forming a liquid flow passage, an alternating excitation source, means for developing an excitation pattern in liquid in a region in said passage and for sensing said excitation pattern, said pattern developing and sensing means including (a) excitation electrode means connected to said excitation source and (b) sensing electrode means, a flow-driven tracker having at least one pattern-distorting element movably cyclically through said region, signal-receiving means connected to said sensing electrode means for providing an output signal that is alternately in phase with or out of phase with the output of the excitation source during cyclic movement of the tracker, and flow-representing signal means including gating means for combining the output of said alternating excitation source with the output of said signal-receiving means to provide trains of signals and signal-interruption intervals representing cyclic movement of said pattern-distorting element past the sensing electrode means and the excitation electrode means.

2. Flow-detecting apparatus as in claim 1 wherein said signal-receiving means includes a high-gain peak-limiting amplifying means.

3. Flow-detecting apparatus as in claim 1 wherein said sensing electrode means comprises a sensing electrode that is positioned in relation to said excitation electrode means and said tracker to develop a sensed-signal output at said sensing electrode whose phase alternates in dependence on the changing positions of said tracker.

4. Flow-detecting apparatus as in claim 3 wherein said signal-receiving means comprises a differential input comparison device having a pair of input electrodes one of which is coupled to said sensing electrode.

5. Flow-detecting apparatus as in claim 4 wherein said differential input comparison device is of the open-collector type having high-gain peak-limiting characteristics.

6. Flow-detecting apparatus as in claim 1 wherein said sensing electrode means comprises a pair of sensing electrodes disposed in relation to said excitation electrode means and said tracker for developing in-phase sensed signals of different amplitudes at said sensing electrodes, the relative amplitudes of said signals alternating with changing positions of the tracker relative to said sensing electrode means and said excitation electrode means, and wherein said signal-receiving means comprises a differential signal comparison device having a pair of input electrodes coupled to said sensing electrodes, respectively, for providing an output signal whose phase undergoes phase reversals as one and then the other of said sensing electrodes provides the greater input to the signal-receiving means.

7. Flow-detecting apparatus as in claim 6 wherein said differential signal comparison device is of the open-collector type having high-gain peak-limiting characteristics.

8. Flow-detecting apparatus as in claim 1 or 6 wherein said means forming a liquid-flow passage is a metal conduit and wherein said excitation electrode means comprises a pair of excitation electrodes one of which is said metal conduit and the other of which is a localized excitation electrode.

9. Flow-detecting apparatus as in claim 1, 3 or 6, wherein said tracker is made of electrical insulation having a high resistivity compared to the resistivity of the liquid whose flow is to be detected.

10. Flow-detecting apparatus as in claim 1 wherein said signal-receiving means includes amplifying means having a switching characteristic and a bias connection controlling its switching point, further including a negative feedback loop having a long time constant compared to the period of said signals and signal-interruption intervals at the lowest flow rate to be monitored, said negative feedback loop being connected from said flow-representing signal means to said bias connection.

11. Flow-detecting apparatus as in claim 3 wherein said signal-receiving means comprises an input comparison device having positive and negative inputs such that signals to the positive input develop like output of said device and signals to the negative input develop inverse output of said device, said sensing electrode being connected to one of said inputs, further including a negative feedback loop having a long time constant compared to the period of said trains of signals and signal-interruption intervals at the lowest flow rate to be monitored, said negative feedback loop being connected from said flow-representing signal means to one of said inputs of the signal comparison device.

12. Flow-detection apparatus as in claim 6 wherein said signal receiving means comprises signal comparison means having positive and negative inputs such that signals to the positive input develop like output of the signal comparison device and signals to the negative input develop inverse output, said positive and negative inputs being coupled to said sensing electrodes, respectively, further including a negative feedback loop having a long time constant compared to the period of said trains of signals and signal-interruption intervals at the lowest flow rate to be monitored, said negative feedback loop being connected from said flow-representing signal means to one of said inputs.

13. Flow-detecting apparatus as in claim 1, wherein said excitation electrode means includes a pair of excitation electrodes and wherein said sensing electrode means includes a sensing electrode between said excitation electrodes.

14. Flow-detecting apparatus as in claim 1, wherein said sensing electrode means includes a pair of sensing electrodes and said excitation electrode means includes an excitation electrode between said pair of sensing electrodes.

15. Flow-detecting apparatus as in claim 1, wherein said sensing electrode means includes a pair of sensing electrodes arranged in relation to said excitation electrode means for producing mutually in-phase sensed signals whose relative amplitudes vary in dependence on the position of said tracker.

16. Flow-detecting apparatus as in claim 1 wherein said sensing electrode means comprises a sensing electrode related to the excitation electrode means for developing a non-phase-reversing sensed signal whose amplitude changes in dependence on varying positions of the tracker and wherein said signal receiving means comprises a differential comparison device having a first input operable at a first bias and having a second input, one of said inputs being coupled to said sensing electrode, further including a long-time-constant negative feedback loop between the flow-representing signal means and said second input of the signal comparison means for developing bias for the second input offset from said fixed bias at a level between the range of variation of the sensed signal during flow-induced movement of the tracker, for rendering the comparison device non-responsive to sensed signals having one sign of deviation from said developed bias while supporting output of the comparison device in response to siqnals having the opposite sign of deviation.

17. Flow-detecting apparatus as in claim 1, wherein said sensing electrode means comprises only one sensing electrode coupled to said signal receiving means, said one sensing electrode being arranged in relation to said excitation electrode means to develop a constant-phase variable amplitude sensed signal in dependence on varied positions of said tracker.

18. Flow-detecting apparatus as in claim 1, wherein said sensing electrode means comprises only one sensing electrode coupled to said signal receiving means, said one sensing electrode being arranged in relation to said excitation electrode means to develop a sensed signal that undergoes phase reversals in dependence on varied positions of the tracker.

19. Flow-detecting apparatus as in claim 15 wherein said signal receiving means comprises a differential signal comparison device having a switching characteristic and having a pair of inputs coupled respectively to said sensing electrodes.

20. Flow-detecting apparatus as in claim 13, 17 or 18, wherein said signal receiving means comprises a differential input comparison device having a switching characteristic and having a pair of inputs one of which is coupled to said sensing electrode and the other of which is coupled to a reference.

21. Flow-detecting apparatus as in claim 19, further including a long-time-constant negative feedback loop between said flow-representing signal means and an input of said comparison device.

22. Flow-detecting apparatus as in claim 20, further including a long-time-constant negative feedback loop between said flow-representing signal means and an input of said comparison device.

23. Flow-detecting apparatus as in claim 1, wherein said signal receiving means has an open-collector output and wherein said gating means includes a coupling device having an open-collector output connected to the open-collector output of the signal receiving means as an AND-ing circuit to yield a succession of excitation pulses or a signal-interruption interval in dependence on the position of said tracker.

24. Flow-detecting apparatus as in claim 1, wherein the frequency of said excitation source is much higher than the highest frequency of the tracker passing the sensing electrode means.

25. Flow-detecting apparatus as in claim 1, wherein said tracker is a high-resistivity vaned turbine type rotor.

26. Flow-detecting apparatus as in claim 1, wherein said excitation electrode means comprises a spaced-apart pair of elongated oppositely phased excitation electrodes and wherein said sensing electrode means comprises a sensing electrode disposed between first portions of said excitation electrodes and wherein said tracker is a vaned turbine type rotor whose vanes sweep past said sensing electrode, further including a second sensing electrode spaced substantially from the first-mentioned sensing electrode and located between second portions of said excitation electrodes, a second vaned turbine-type rotor whose vanes sweep past said second sensing electrode, and a second alternating excitation source connected to said excitation electrodes, the frequency of said second excitation source being different from but compatible with the frequency of the first-mentioned excitation source.

27. In a fluid-flow detector, amplitude-to-phase conversion apparatus including a signal comparison device having negative and positive inputs such that an input signal applied only to the positive input develops a like output and the same input signal applied only to the negative input develops inverse output from the signal comparison device, and means for concurrently applying periodic input signals having in-phase peaks of like polarity to said inputs of the comparison device wherein the amplitude of peaks of a particular polarity of the applied signals is higher at one of said inputs at times and higher at the other of said inputs at times, said signal applying means including means responsive to fluid flow, whereby the output of the signal comparison device becomes alternately high and low in dependence on which of the inputs has the higher applied signal of the particular polarity.

28. In a fluid-flow detector amplitude-to-phase conversion apparatus as in claim 27, including means responsive to a periodic reference signal in phase with said input signals for gating the output of the signal comparison device to yield output only while said higher signal is applied to a particular one of said inputs.

* * * * *